United States Patent [19]

Hamilton et al.

[11] Patent Number: 5,491,558
[45] Date of Patent: Feb. 13, 1996

[54] METHOD AND ASSOCIATED APPARATUS FOR WRITING A HALFTONE DOT HAVING A VARIABLE DENSITY EDGE PROFILE

[75] Inventors: John F. Hamilton, Rochester; Anthony J. Leone, Pittsford, both of N.Y.

[73] Assignee: Eastman Kodak Company, Rochester, N.Y.

[21] Appl. No.: 998,088

[22] Filed: Dec. 29, 1992

[51] Int. Cl.$^6$ .............................. H04N 1/40; G06K 9/40
[52] U.S. Cl. .................... 358/298; 358/459; 382/266
[58] Field of Search .................... 358/298, 454, 358/455, 456, 458, 459, 460, 465, 466; 382/22, 54, 199, 254, 266

[56] References Cited

U.S. PATENT DOCUMENTS

| | | | |
|---|---|---|---|
| 5,134,667 | 7/1992 | Suzuki | 382/22 |
| 5,231,677 | 7/1993 | Mita et al. | 382/22 |
| 5,233,441 | 8/1993 | Hamilton | 358/298 X |
| 5,239,391 | 8/1993 | Hamilton | 358/459 |
| 5,251,267 | 10/1993 | Kawamura | 358/455 X |
| 5,299,308 | 3/1994 | Suzuki et al. | 358/456 X |

*Primary Examiner*—Peter S. Wong
*Assistant Examiner*—Eric Frahm
*Attorney, Agent, or Firm*—Edward Dugas

[57] ABSTRACT

A method and associated apparatus is implemented for utilization in a halftone printing system to permit a halftone dot to be written with multiple density levels. These multiple density levels are used to from a variable density dot edge profile. This implementation is particularly adapted for use with systems that represent halftone dots with an envelope that is formed from a combination of straight lines that are drawn from tangent points, on the outer periphery of the dot, through reference axis for the dot. The intersection points of the tangent lines on the reference axis define the size (density) of the dot. The intersect points are stored as sets of digital values for each size dot to provide a unique representation set that is used to reconstruct a selected dot size for the printing of a halftone image.

11 Claims, 13 Drawing Sheets

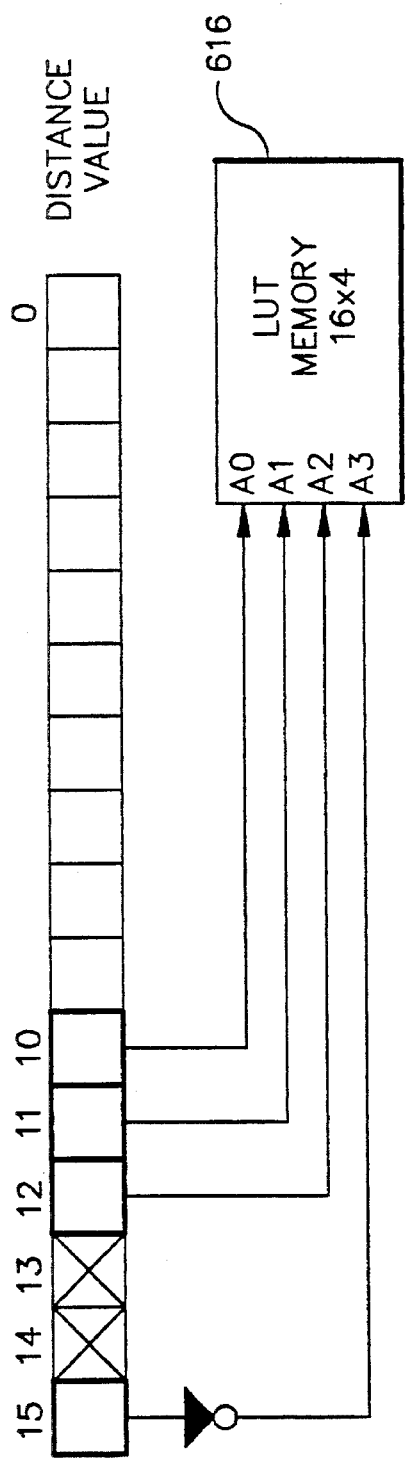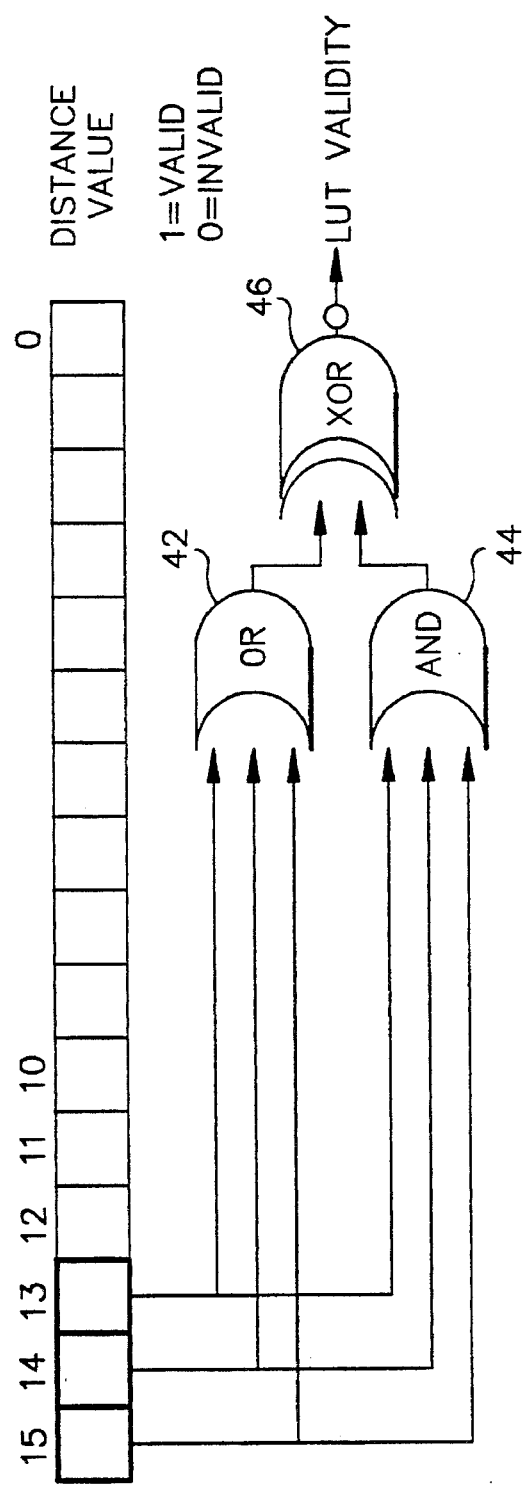
FIG. 10
FIG. 11

METHOD AND ASSOCIATED APPARATUS FOR WRITING A HALFTONE DOT HAVING A VARIABLE DENSITY EDGE PROFILE

CROSS-REFERENCE TO RELATED APPLICATION

The present application is related to the following applications:

U.S. patent application Ser. No. 854,176 entitled "An Apparatus for Halftone Dot Representation" filed Mar. 20, 1992 (now U.S. Pat. No. 5,239,391.

U.S. patent application Ser. No. 854,164 entitled "An Envelope Method For Halftone Dot Representation" filed Mar. 20, 1992 (now U.S. Pat. No. 5,233,441).

U.S. patent application Ser. No. 956,703 entitled "Displacement Engine For Introducing Noise Into a Halftone Screener" filed Oct. 5, 1992.

U.S. patent application Ser. No. 956,930 entitled "Apparatus and Associated Method for Representing Elliptical Halftone Dots" filed Oct. 5, 1992.

FIELD OF INVENTION

The present invention is directed to the field of halftone printing wherein arrays of bit maps are used to form dot shapes on a printing media and more particularly to a unique method and associated apparatus for generating a variable density edge profile for halftone dots formed from digital values that represent lines that in turn represent the dots' contour.

BACKGROUND OF THE INVENTION

In the halftone printing art variations in the density of a color are represented by variations in the size (area) of small dots on a grid pattern. This permits the visual detection of shades of gray and color tone. A patent of interest for its teaching of dot size being a function of density is U.S. Pat. No. 4,680,645, entitled "Method For Rendering Gray Scale Images With Variable Dot Sizes" by Dispoto et al. With such methods the dots themselves do not have to be circular in shape but can have any number of shapes. With the advent of digital computers and digital printers into the printing art, digital bits, representing the desired sizing and shape of the dots, are stored and accessed from the computer or printer's memory and are used to cause the desired printing of the images onto hard copy. In digital systems the halftone dot shapes may be stored either as arrays of threshold values(e.g. 64×64×8 bits) or as arrays of bitmaps (e.g. 64×64×256 bits). The quality of the shape of the dots is a function of the number of bits (sample points) that are used in the printing process. Obviously, as more bits are used to increase the quality of the formed dot the greater will be the use of the computer or printer's memory space. In addition, with more bits stored in memory the longer it will take, in terms of access time, to call forth all the bits needed to drive the printing device. In the art, the number of sample points used to represent an image in an array of spaced rows and columns of sample points is called the mesh. It has been shown that there is an improvement in the quality of formed dots when the number of sample points in an array increases. What is known is that sampling in a 256×256 array or a 128×128 array, in place of a 64×64 array, achieves only a slightly improved dot shape at the cost of 16 times and 4 times, respectively, in the amount of memory required to store the threshold or bitmap values.

In addition to the above mentioned increase in memory requirement, to achieve an increase in the quality of the formed dots when a digital screening pattern is used to print out the dots a problem of automoire or patterning is created. This is caused by the step of re-sampling the already sampled dot shapes. These problems have caused a great deal of development time to be spent looking for the "magic" combinations of screen rulings and screen angles which will produce dots without moire through the entire range of dot sizes. In conventional halftone printing there are only two density levels that are used-either ink is applied or it is not applied. For digital output writers however this is not necessarily the case. Such writers may be able to write more than two density levels, but not enough levels to create what appears to be continuous density variations. These writers are capable of writing center weighted halftone dots that do not have an abrupt edge profile, but rather one which is smooth or soft appearing. One advantage of having a soft edge dot is that it tends to suppress screener generated moire. Secondly, it allows a writer to use a halftone image structure, which is robust against process and material non-uniformities, while still achieving smooth density variations. This fact is particulary applicable to coarse pitch writers. The present invention provides an improved implementation for forming soft edge dots.

SUMMARY OF THE INVENTION

The preferred method for writing a halftone dot having a variable density dot edge profile is comprising the steps of:

a) associating a density value with a writing location such that within a plurality of areas around the center of the dot the density value decreases to a minimum value as the edge of the dot is approached;

b) performing a writing with the associated density value at the writing location; and c) repeating steps a) and b) for each writing location associated with the halftone dot.

The preferred apparatus for writing a halftone dot having a variable density dot edge profile that is particularly adapted for use with techniques that represent the boundary of the halftone dot with the envelope of multiple geometric elements is comprised of the following:

a) means for associating a density value with each geometric element as a function of a writing location;

b) means for determining the minimum of the associated density values; and c) means for receiving the minimum density value and for initiating a writing with the minimum density value at the writing location.

From the foregoing it can be seen that it is a primary object of the present invention to provide an improved method and associated apparatus for digitally writing a halftone dot with a variable density edge profile.

It is another object of the present invention to provide a method and associated apparatus for writing a variable density edge profile for a halftone dot whose contour is represented by a number of lines.

These and other objects of the present invention will become more apparent when taken in conjunction with the following description and drawings wherein like characters indicate like parts and which drawings form a part of the present description.

BRIEF DESCRIPTION OF THE DRAWINGS

FIG. 10 is a circuit diagram illustrating the conversion of a 16 bit distance value into a 4 bit address for accessing a LUT.

FIG. 11 is a logic circuit for receiving bits of a distance value and for providing an output indicative of the distance value being within the range of an LUT.

DESCRIPTION OF THE PREFERRED EMBODIMENTS

Figure 1:
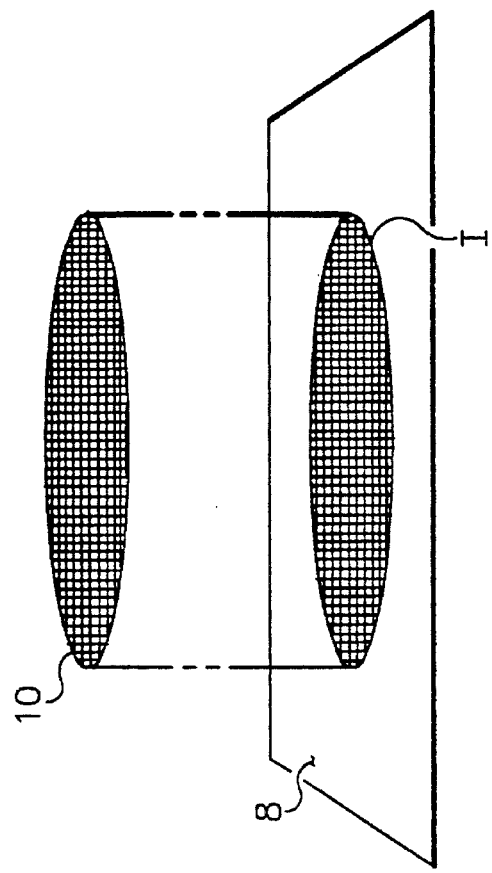
FIG. 1 illustrates in perspective view, the prior art printing of a dot without a variable density edge profile.

Before describing in detail the implementation of the present method in a digital halftone printing system it should be observed that the present invention resides in a novel method and unique structural combination of conventional digital signal processing components and not in the particular detailed configurations thereof.

Accordingly, the arrangement of these conventional components have been illustrated in the drawings by readily understandable block diagrams which show only those specific details that are pertinent to the present invention, so as not to obscure the disclosure with structural details which will be readily apparent to those skilled in the art having the benefit of the description herein. Thus, the block diagram illustrations of the Figures are primarily intended to illustrate the major structural components of the system in a convenient functional grouping, whereby the present invention may be more readily understood.

Figure 2:
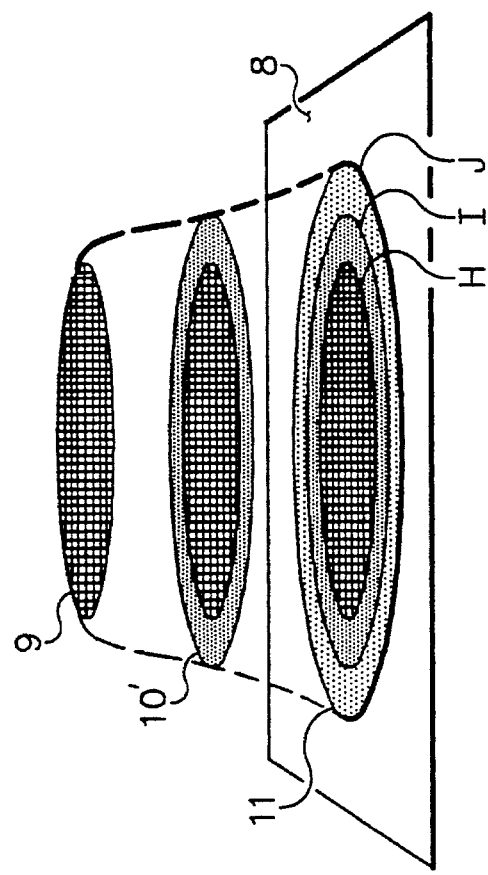
FIG. 2 illustrates in perspective view, the prior art printing of a dot with edge profile.

FIG. 1 illustrates the projection of a dot 10 onto a printing surface 8 for the case where all of the print positions forming the dot are printing at one level, black. The printing of dots in this fashion is well known in the art. In FIG. 2 a dot 10' is printed with multiple output levels, namely with a center 9 that is black and with annulus rings defined by edges H, I, and J, of diminishing densities to form the dot 11 on the printing surface 8. This type of printing is also well known in the art and is used to give the dot a smoother look that is less ragged at the edges and to reduce screener induced moire patterns.

Figure 3:
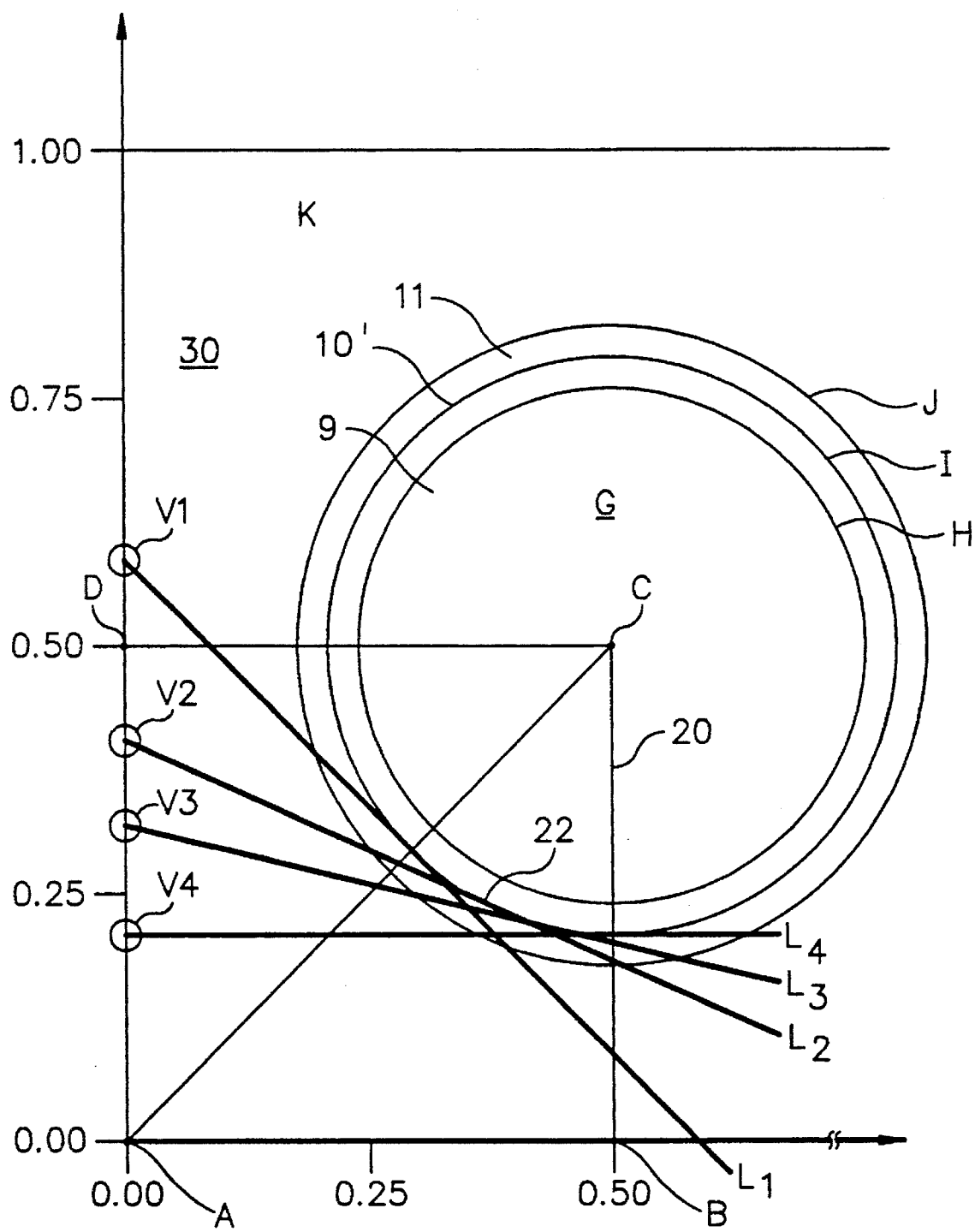
FIG. 3 illustrates a unit cell within which is positioned a dot the envelope of which is represented by tangent lines to its contour which dot is shown with annular rings of differing density.

Referring now to FIG. 3, a unit cell 30, normalized to the value 1 along its vertical and horizontal dimensions, contains the dot 10 that is to be printed. The dot center 9 is defined with an edge H. A first annular ring of variable density is defined between the edge H and an edge I. A second annular ring of variable density is defined between the edge I and the edge J. The edge I defines the edge of the dot 10' the contour of which is outlined by the tangent lines L1 through L4. The tangent lines intersect the normalized vertical axis of the unit cell at points (values) denoted as V1 through V4, respectively. These values are unique to the size of the dot and are represented as sets of digital values. The formed sets of digital values for each size of dot are stored for later use in the printing process.

The dot forming technique of the present invention is particularly adapted to a dot that is formed by representing the dot boundary with an envelope of tangent lines. For a symmetrical dot replicating and flipping the values of the tangent lines for one section will form the values for the remaining sections of the dot. One quarter of the unit cell 30 is outlined with triangles ACD and ABC. The values V1 through V4 represent the contour 22 of the dot 10'. These values, because of symmetry may be used to form the entire dot without recording the values for all of the dot's contour.

The techniques for deriving the values that represent the tangent lines and the apparatus that performs the formation of the dots for printing from these values are described in detail in the patent applications cross-referenced at the beginning of this specification. The teachings of those applications are incorporated herein as if set out in full and are recommended to the reader if further details of those features are desired. In the present invention, the distance from the edge of the dot to a sample point where printing is to take place, is determined to permit the introduction of intermediate density levels near the edge. The resultant being that the dot center remains black away from the edge and that the outside of the dot, away from the edge, remains white, and that diminishing densities appear therebetween. The tangent lines labeled L1 through L4 are selected to have slopes of −1, −½, −¼, and 0, respectively. They are approximating the portion 22 of the edge contour I. The distance of interest is the perpendicular distance from the tangent lines, forming the contour I, to a contour of uniform density, represented by the contour line P in FIG. 4. As an aid in the understanding of the invention the contour line P represents the line on which densities of one level are printed at each of the sample points that form the contour line. The dot is made up of many contour lines with P representing the particular contour line that is being processed for the purpose of example. The next contour line to be processed is handled in a like manner and thus may be identified as the next contour line P.

Figure 4:
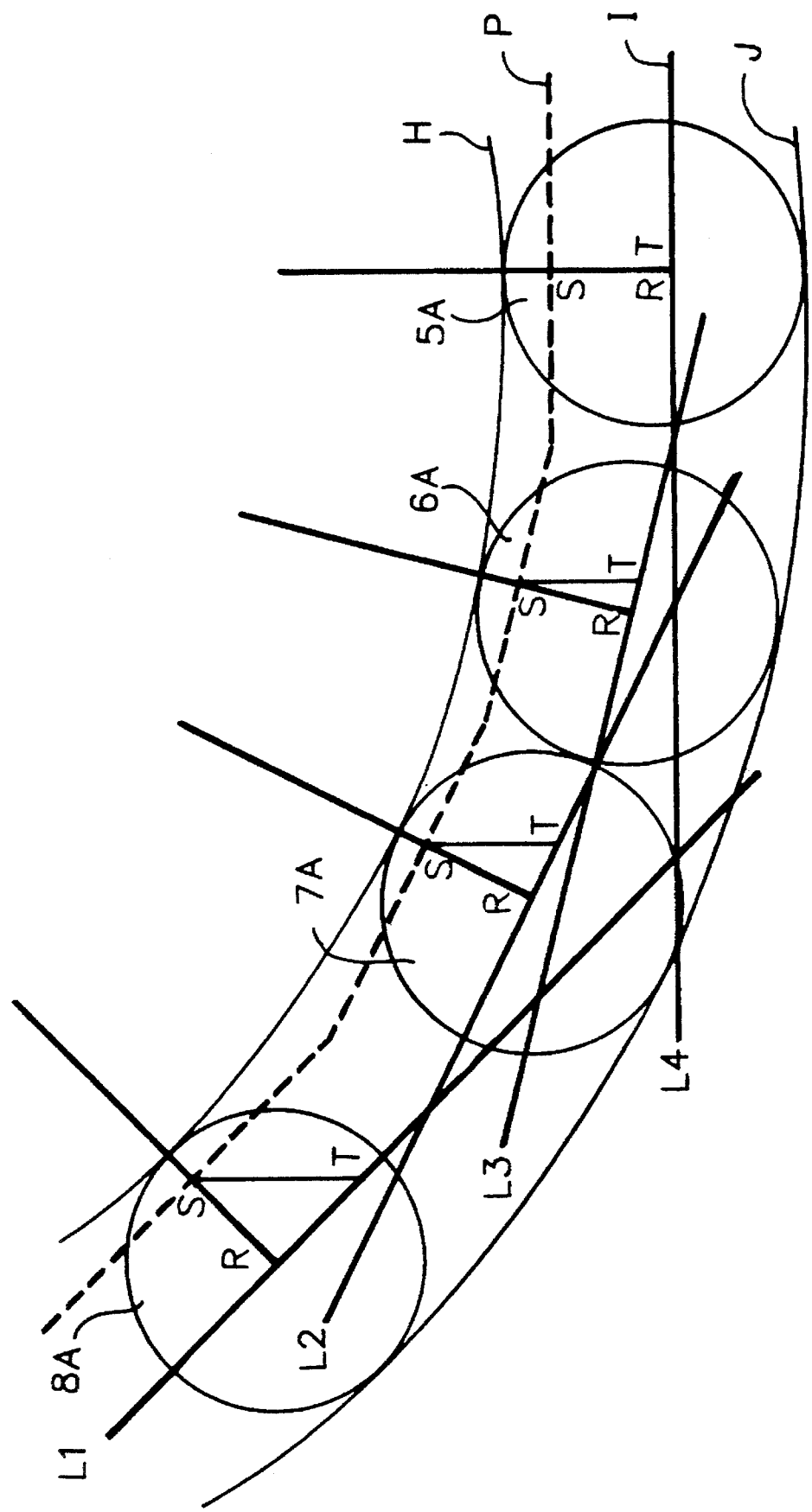
FIG. 4 is an enlarged view of that portion of the dot envelope represented by the tangent lines shown in FIG. 3.
Figure 5A:
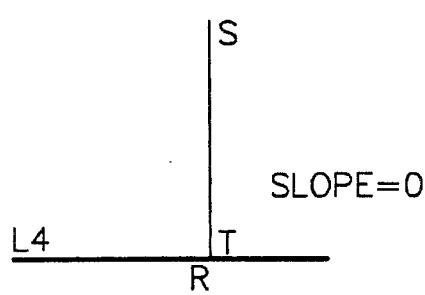
FIGS. 5A and 5B illustrate a distance line ST with reference to the tangent line L4 and the transfer function of an associated LUT, respectively.
Figure 5B:
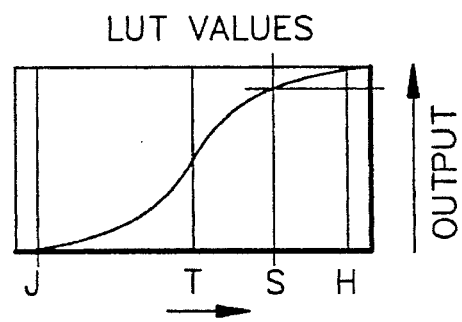
Figure 6A:
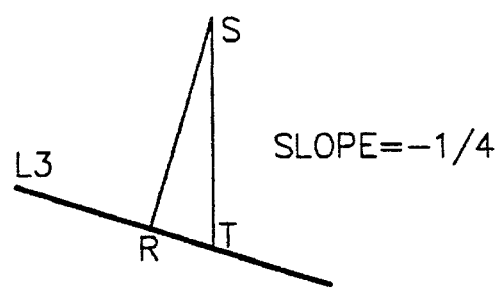
FIGS. 6A and 6B illustrate the distance line ST with reference to the tangent line L3 and the transfer function of an associated LUT, respectively.
Figure 6B:
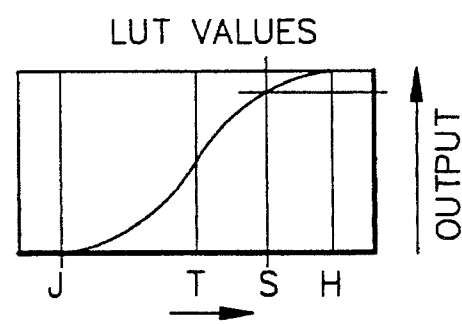
Figure 7A:
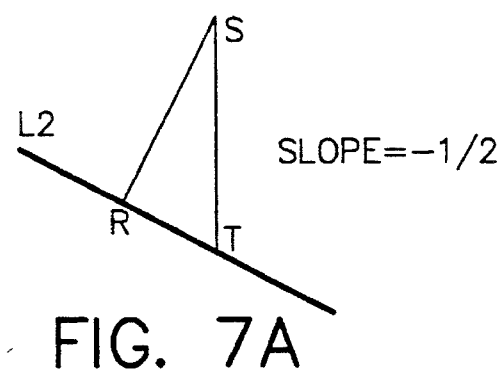
FIGS. 7A and 7B illustrate the distance line ST with reference to the tangent line L2 and the transfer function of an associated LUT, respectively.
Figure 7B:
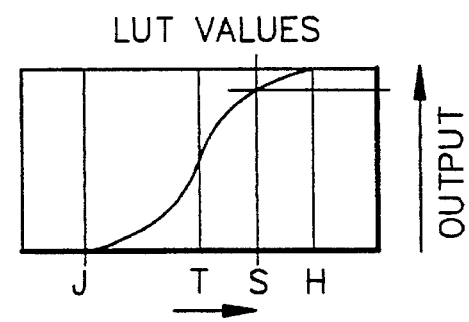
Figure 8A:
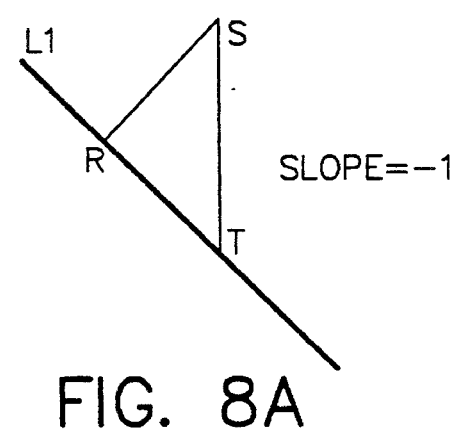
FIGS. 8A and 8B illustrate the distance line ST with reference to the tangent line L1 and the transfer function of an associated LUT, respectively.
Figure 8B:
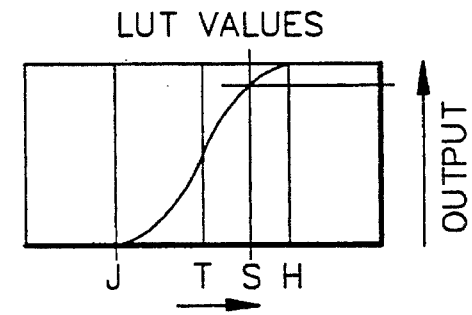

FIG. 4 is an enlarged view of the area surrounding the tangent lines which more clearly illustrates the perpendicular distance RS which is the distances of interest for each of the tangent lines L1 through L4. A number of hardware configurations may be implemented to determine the distance of point S from the tangent line; one utilizes the computation of the perpendicular distance between points R and S, the other determines the distance between points T and S as a function of the slope of the tangent line. At this point in time the determination of the distance ST requires less expensive hardware than that needed for the determination of the distance RS, therefore the following description of the preferred embodiment of the invention will be directed to the less expensive hardware implementation. The sample points S lie on an iso-density contour P. It is to be understood that there are a multiplicity of iso-density contours in the region between H and J. The circles labeled 5A, 6A, 7A, and 8A identify the relationships between the distances RS and ST which relationships are further illustrated in the like labeled Figures. FIGS. 5B, 6B, 7B, and 8B functionally illustrate the output response of look up tables (LUTs) associated with each of the tangent lines L1 through L4 for the distances ST. In each case the LUT input value is the distance ST and the LUT output value is the density level to be printed. It is to be noted that as the slope of the contour lines L increases the distance ST also increases, but the distance RS remains the same. This increase is reflected in the displayed width of the LUT which increases from FIG. 5B through FIG. 8B, but which results in the LUT output value being the same. With the output values being the same the density level that is printed for each of the points along the isodensity contour P will be the same. In a like manner, the printing densities selected for any other isodensity contour will be the same in that respective contour.

Figure 9:
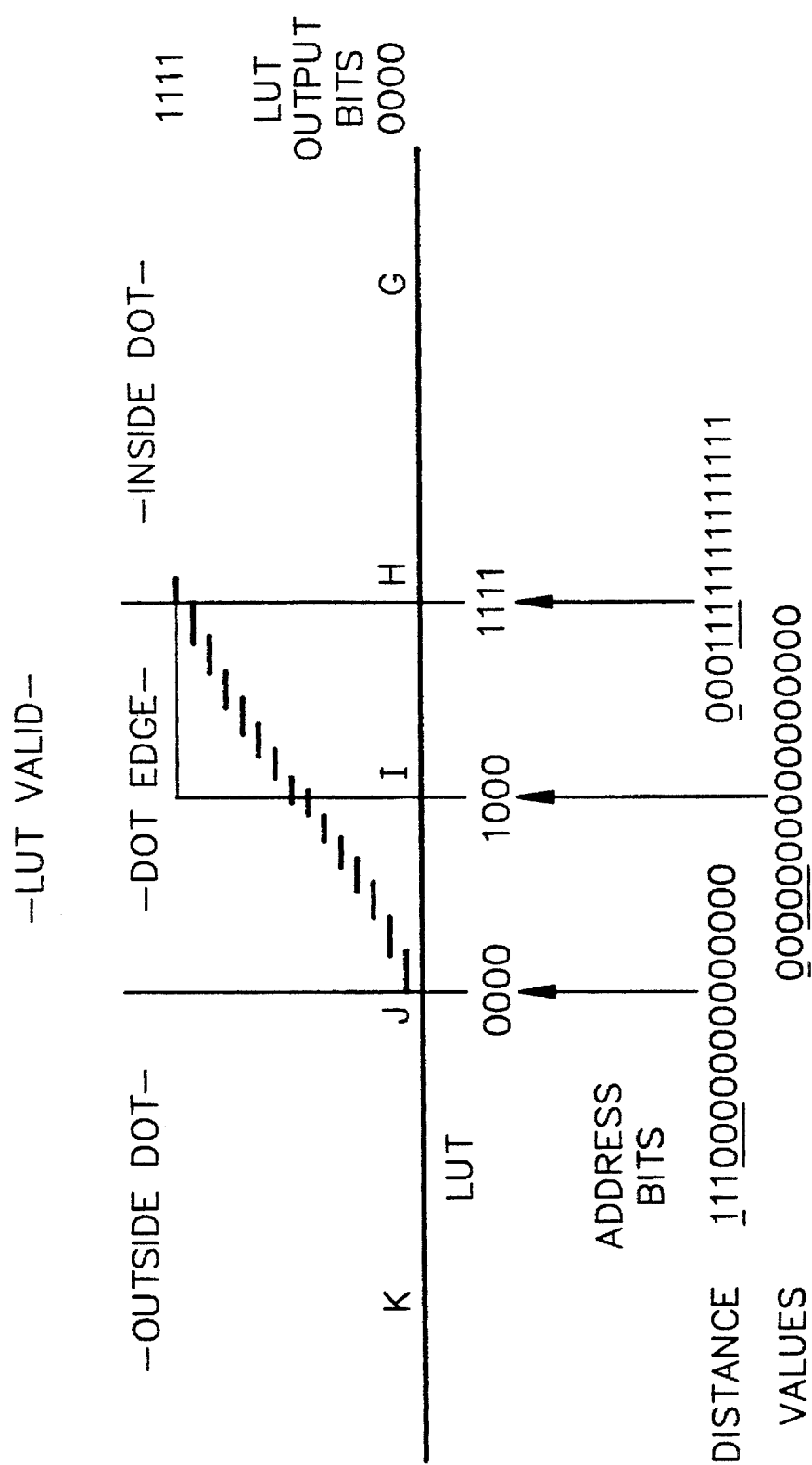
FIG. 9 illustrates the transfer function of a LUT and the range for which the transfer function is valid along with the values assigned when outside of is range.

In FIG. 9 the transfer function of a 16×4 LUT is illustrated as being valid in the region between points J and H. For values outside of the dot, that is in the region identified as JK, the density value to be printed is selected to be the LUT output bits 0000 (white). For values inside of the dot, that is in the region identified as HG, the density value to be printed is selected to be the LUT output bits 1111 (black). Refer back to FIG. 3 to see the areas defined by G and K. The dot edge, identified as I, represents the mid-point between J and H and corresponds to the LUT address bits 1000. The points J and H correspond to the LUT address bits 0000 and 1111, respectively. The distance values are 16 bits in length and are shown below their respective LUT address bits. Each bit that is relevant to the determination of the respective LUT addresses is underlined for ease of understanding.

FIG. 10 illustrates one circuit arrangement for transforming the 16 bit vertical distance values ST into 4 bit address values that are applied to the address inputs, labeled A0 through A3 of a 16×4 LUT 616. There are four identical circuit arrangements, each one associated with a respective tangent line L1 through L4. The number of bits left out is indicated by an X in the bit position box.

FIG. 11 illustrates a circuit for determining the validity of a vertical distance value ST being within the range of the LUT 616. The 13th, 14th and 15th bits of the vertical distance value signal ST are applied as inputs to an OR gate 42 and an AND gate 44. The output from each gate is applied as an input to an EXCLUSIVE OR gate (XOR) 46. The output from gate 46 is inverted to provide the signal LUT Validity. The net result of this circuit is that if the leading bits 15 through 13 are all the same then the LUT Validity signal is true otherwise it is false. In the description of FIG. 10 above mention was made of the bits left out. The number of bits that are selected to be left out determines the relative width (size) of the annulus ring of the dot edge. For example, to decrease the width of the annulus by a factor of two, bits 15, 14, 13, and 12 would be used as the inputs to the gates 42 and 44 while the LUT address bits A0 to A3 would be taken from bits 15, 11, 10, and 9.

Figure 12:
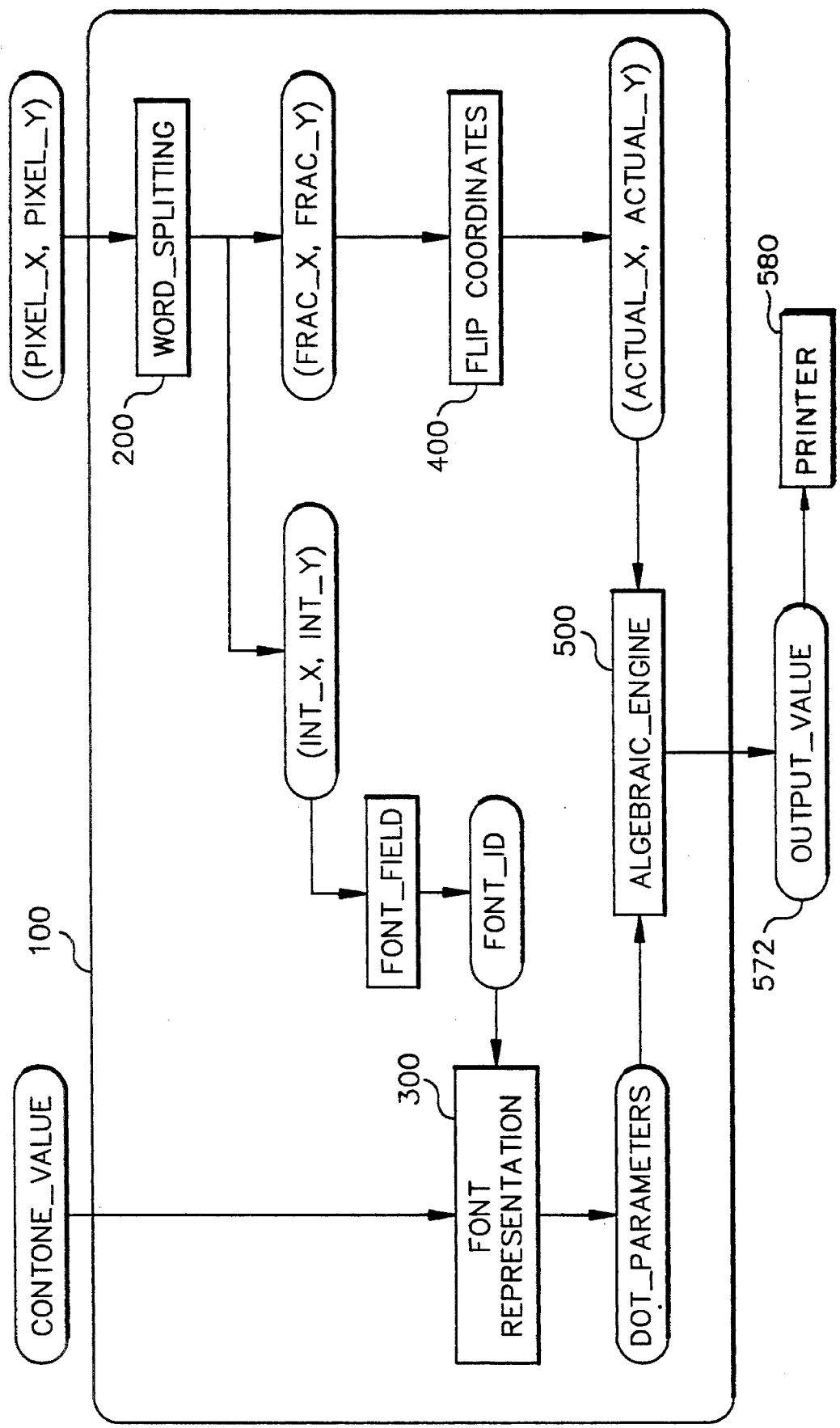
FIG. 12 is a functional block diagram of a multilevel printing screener based on tangent lines representing the envelope of a dot and incorporating the multilevel density technique of the present invention.
Figure 13:
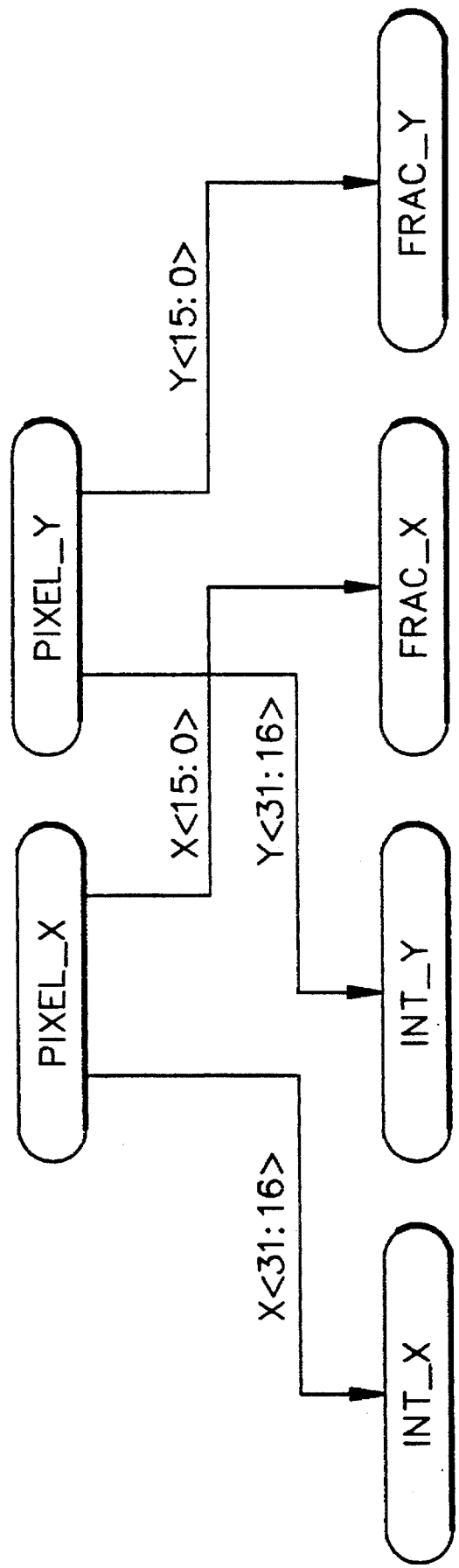
FIG. 13 illustrates in further detail the word splitting block 200 of FIG. 12.

A halftone screener 100 incorporating the present invention is illustrated in FIG. 12 Referencing FIGS. 1A and 1B of U.S. Pat. No. 5,233,441, and the description at column 3, lines 3436, the positioning of the halftone screener 100 of the present invention within a digital halftone printing system is disclosed as it is substituted for the font decoder 100 shown in FIG. 7 of the U.S. Pat. No. 5,233,441 patent. Within the halftone screener is a word splitting module 200 that functions to form two signal groups of high and low order bits, int and frac, respectively from pixel_X and pixel_Y signals, respectively. The word splitting module 200 is illustrated in detail in FIG. 13. The values int_x and int_y are represented by 2-bytes (16 bits of the bits defining pixel_x and pixel_y) and the values frac_x and frac_y are represented by 2-bytes of low order bits. The high order bytes represent the integer value of pixel position and the low order bytes represent the fractional value of the pixel's x-y coordinate position. The integer byte values are used to select, from a font representation module 300, which font is to be printed. In the most limited system only one font type would be available. Although many different types of storage devices may be used to addressably store the dot parameters in the preferred embodiment of the invention a look-up table (array) was used. A partial address is obtained by the contone value with the remainder being obtained from the font_id (when multiple fonts are provided).

Figure 14:
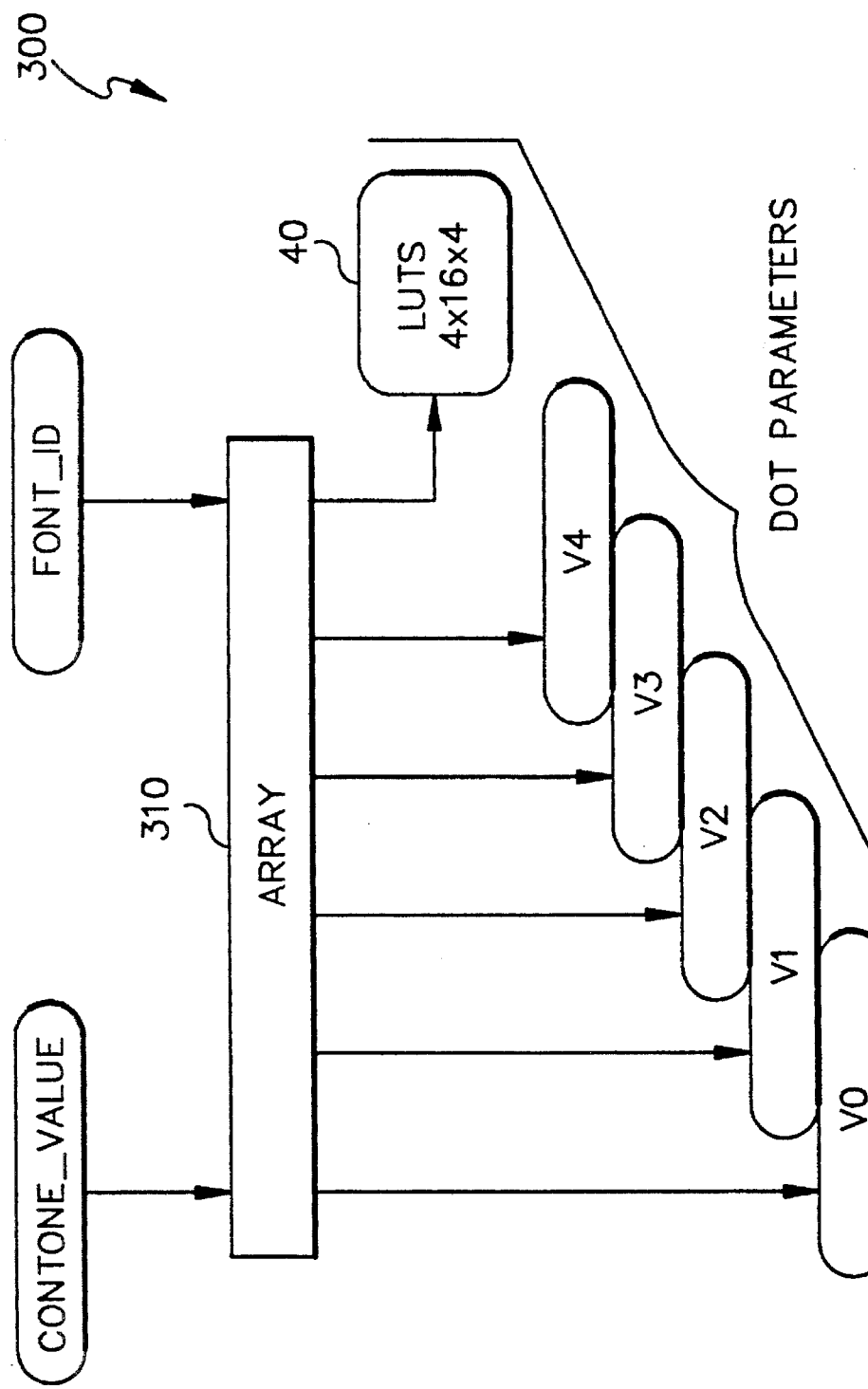
FIG. 14 illustrates in further detail the font representation block 300 of FIG. 12.

The font representation module 300, illustrated in logic form in FIG. 14, is an array 310 of dot descriptors having a dot descriptor for each contone value. Each dot descriptor is a set of dot parameters in which all necessary dot information needed for reconstruction is encoded. For each combination of contone_value and font_id there is a unique set of dot parameters V0, V1, V2, V3, and V4 which are sent to an algebraic engine 500. In this implementation there is provided four LUTs 40 each one being associated with one of the tangent lines L1 through L4 and each stores the density values as a function of the vertical displacement ST. It is to be understood that for different fonts it may be desirous to have different edge profiles and this may be accomplished by loading density values related to the font selected. This may also be implemented as a selection of the contone value as well.

The flip coordinates module 400, functions to flip the coordinates from the full cell to the lower left quadrant of the cell to exploit some of the dot symmetry. The result of this coordinate flipping is the sampling point (actual_x, actual_y).

Figure 15:
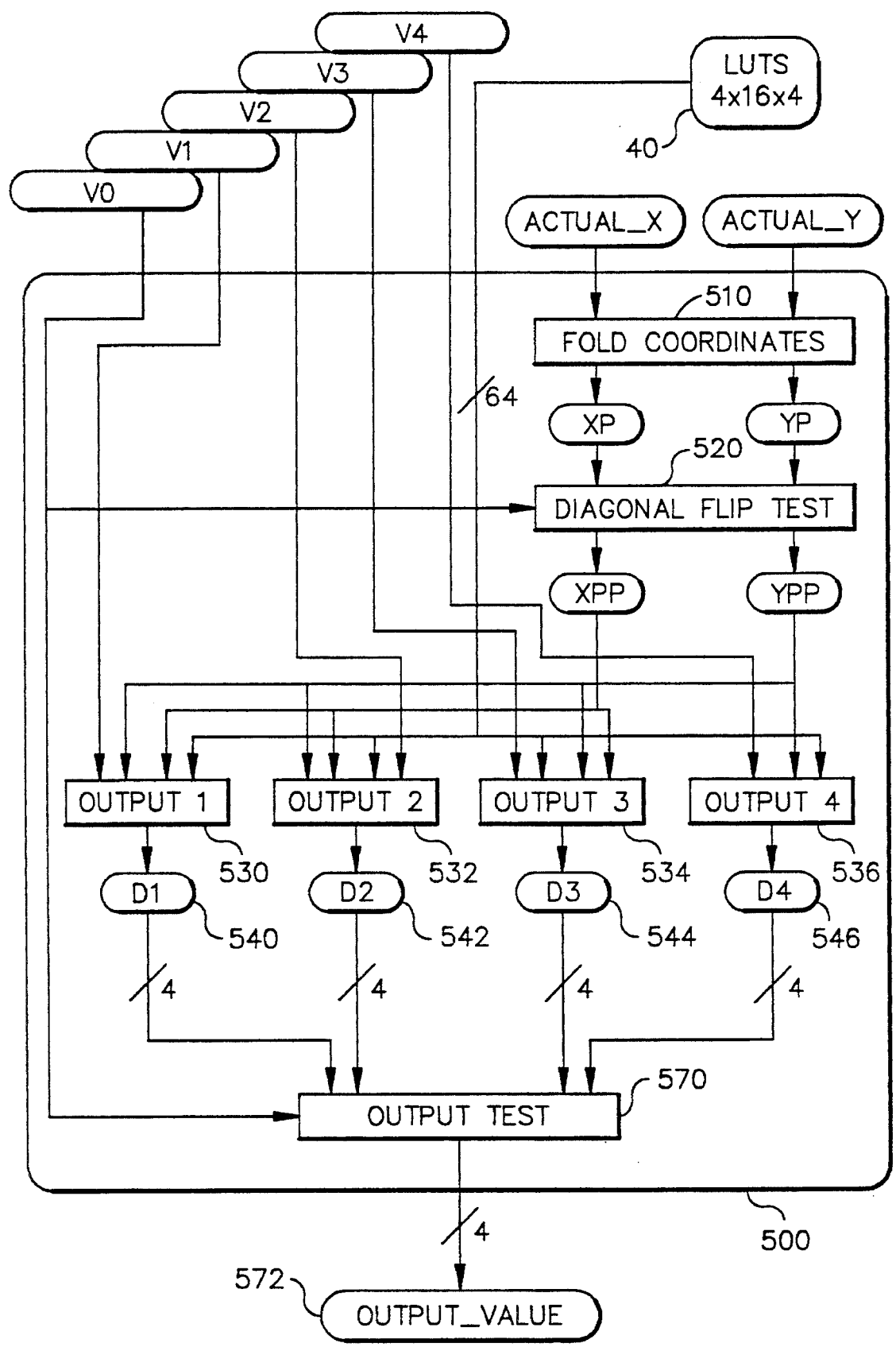
FIG. 15 illustrates in logic block diagram form the algebraic engine block 500 of FIG. 7.

The algebraic_engine 500, illustrated in logic form in FIG. 15, functions to compute a multibit output value 572 based on the sampling point. The output value drives a marking engine such as a printer 580.

FIG. 15 is a logic block diagram of the preferred apparatus implementation of the present invention. The signals actual_x and actual_y are directed to the fold coordinates function block 510, wherein it is determined whether the y coordinate is greater than the x coordinate indicating that the point is in the upper left triangle rather than the lower left one. If y is greater than x then $x_p$=actual_y and $y_p$=actual_x. This action flips the point in the upper triangle about the axis AC to the lower triangle. If actual_x is less than or equal to actual_y, then no change is made, i.e. $y_p$=actual_x and $x_p$=actual_y. Either way the point ($x_p$, $y_p$) ends up in the lower right triangle.

The algebraic engine also receives as inputs the values from the four LUT's 40 and the values V0 through V4.

The diagonal flip test 520 depends on the bit Vo, indicating whether the dot area is above 50% or not. If the dot has an area greater than 50% of the reference cell the point ($x_p$, $y_p$) must be rotated about the axis EE' yielding point ($x_{pp}$, $y_{pp}$). If the dot is 50% or less, no change is required, i.e. $x_{pp}=x_p$ and $y_{pp}=y_p$. In either case ($x_{pp}$, $y_{pp}$) will be compared against a convex envelope located in top portion of the triangle ABC.

Once the position of the envelope within the triangle ABC is determined, computing the distance of the point above the envelope may begin. A negative distance indicates that the point is below the envelope. It is to be remembered that the interest points $V_1$–$V_4$ pertain to lines $L_1$–$L_4$ having slopes −1, −½, −¼, and zero respectively.

Figure 16:
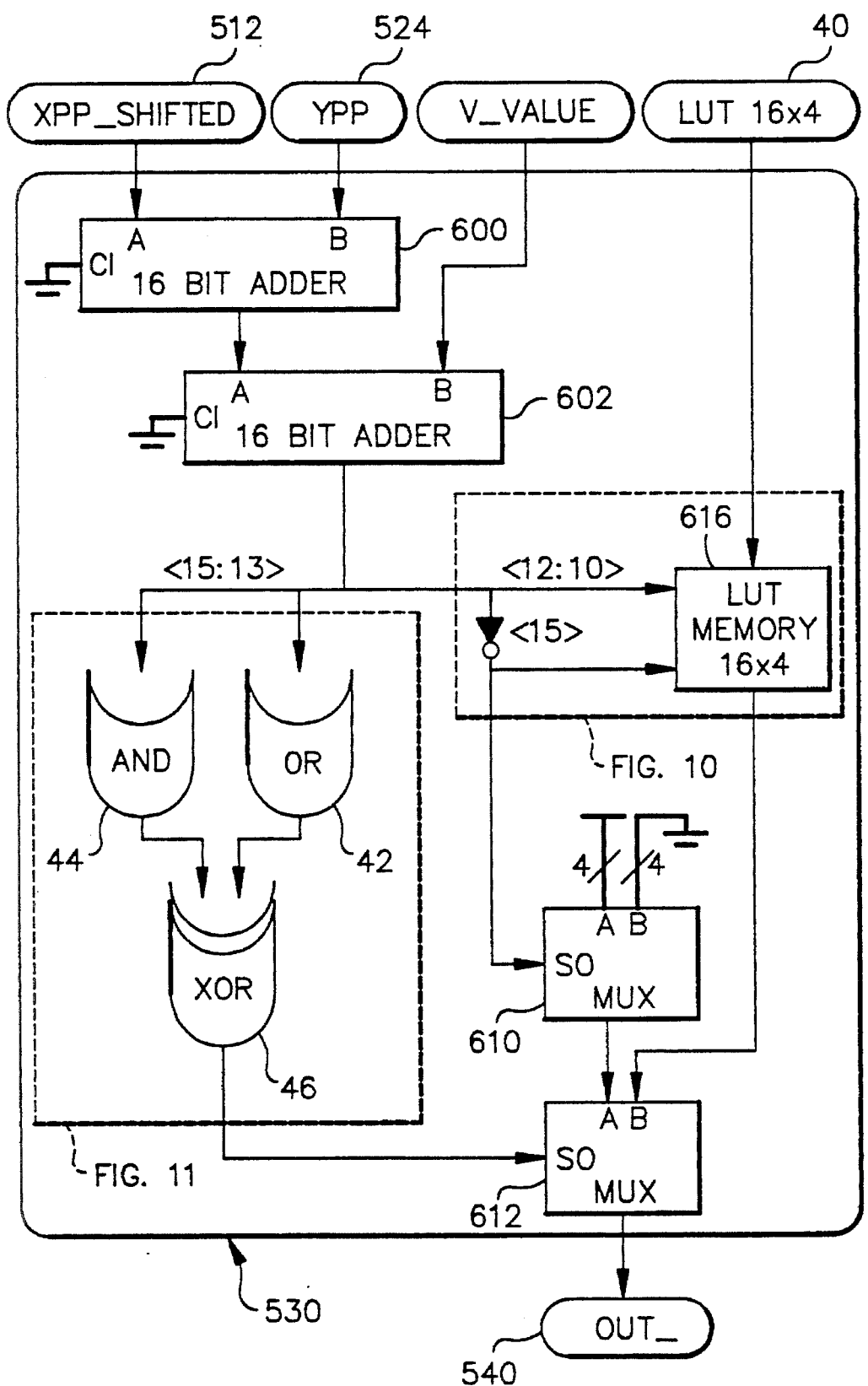
FIG. 16 illustrates in logic block diagram form the compute multibit output blocks for outputs 1 through 3 in FIG. 15.
Figure 17:
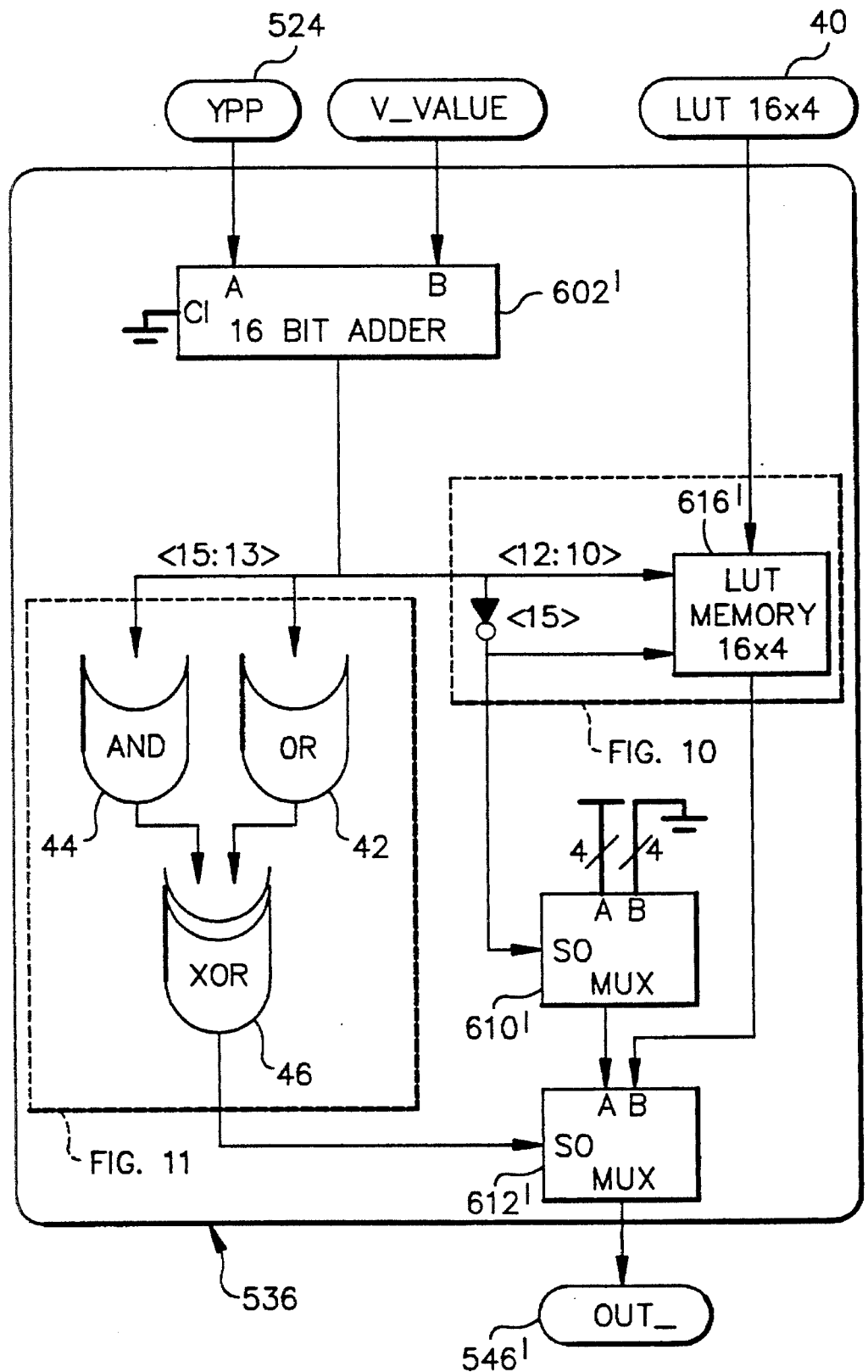
FIG. 17 illustrates in logic block diagram form the compute multibit output block 536 of FIG. 15.

Blocks 530, 532, 534, and 536 function to compute the density levels D1, D2, D3, and D4, respectively. These densities correspond to the perpendicular distances RS associated with a respective tangent line. The detailed circuit arrangement of blocks 530, 532, and 534 is shown in FIG. 16. The detailed circuit arrangement for block 536 is shown in FIG. 17. The outputted density levels are applied as inputs to an output test block 570 via registers 540, 542, 544, and 546. The block 570 also receives as an input the value Vo. The output test block 570 outputs a 4 bit density level which is the minimum of the four input values D1 through D4 to an output _value register 572 (shown in circuit detail in FIG. 18). The minimum value is selected so that the four tangent lines, L1 through L4, produce the desired convex contour. If the maximum value were chosen then a concave contour would result.

Referring to FIG. 16, the logic block diagram represents blocks 530, 532, and 534 which are identical in construction. The circuit 530 receives the xpp output from register 522 shifted so as to accomplish a multiplication by the slope of the tangent line being processed in its associated block. This is based on the fact that a shift in bit position results in a multiplication by a power of two. The selected non zero slopes for the tangent lines are powers of two facilitating this multiplication process. The xpp output is directed to the A input of a 16 bit adder 600. The adder 600 also receives the output from the ypp register on its B input along with its carry in input CI being connected to ground indicating that there is no carry signal. The adder 600 outputs a value that is a partial sum that is needed for computing the vertical distance ST to the A input of another 16 bit adder 602. The B input of the adder 602 is the outputted V value corresponding to the slope intercept value of the respective tangent line. The CI input to the adder 602 is also connected to ground without a carry in value. The output from the adder 602 is the total value of the vertical distance ST. This value is directed to the inputs of the circuits that have been previously described in detail with respect to the descriptions of FIGS. 10 and 11. The 15 bit of the vertical distance signal ST is applied as the select bit to the SO input of a Mux 610. The A input to Mux 610 is tied to a 1111 level that represents the dot being printed (see FIG. 9). The B input to Mux 610 is tied to a 0000 level that represents a dot not being printed. The effect of this MUX is to print the dot without regard to softness at the dot boundary. A MUX 612 receives the logic output from the circuit of FIG. 11 on its SO input to select either the value on its A or its B input. The A input being the output of MUX 610 and the B input being the output from the LUT 616. Away from the dot boundary, where the LUT values are invalid, the circuit of FIG. 11 selects the A input which is the output of MUX 610. Close to the dot boundary, where the LUT is valid, the circuit of FIG. 11 selects the B input which are the LUT values. As previously discussed with respect to FIG. 11, the bits 13 through 15 determine the LUT validity. The output value from the MUX 612 is a 4 bit density level D that is stored in the register 614.

Referring to FIG. 17, the compute distance output block 536 is substantially identical to the other compute distance output blocks 530, 532, and 534. The only difference is in the elimination of the 16 bit adder 600 and its input xpp shifted value. The value of the slope of the tangent line L4 is zero and when multiplied by the value xpp will produce a zero which when added to the value ypp must produce ypp itself. Because the value ypp must remain unchanged there is no need for the adder 600. The output of the block 536 is directed to the output register 546 as its input.

Figure 18:
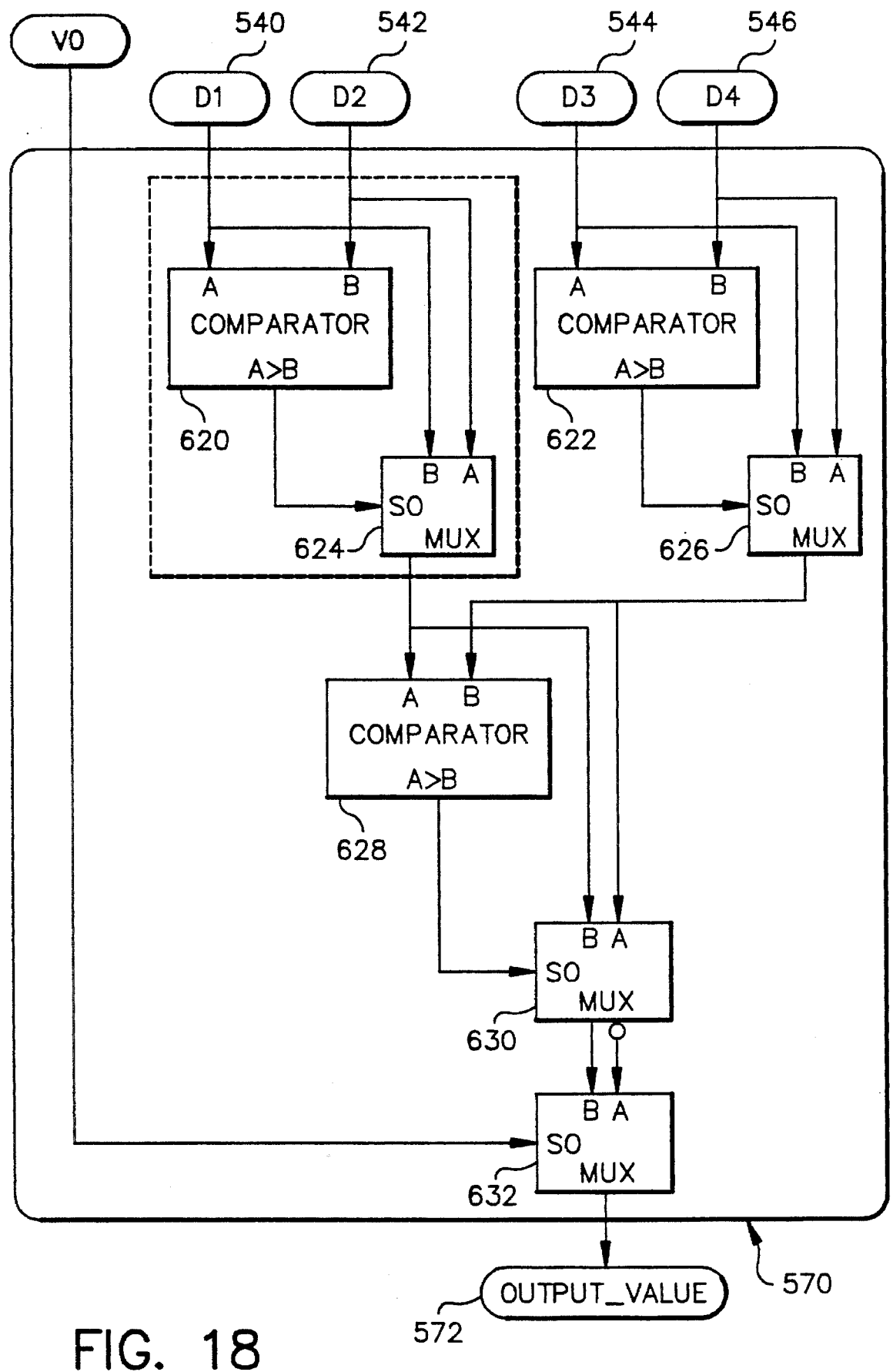
FIG. 18 illustrates in logic block diagram form the output block 570 of FIG. 12.

FIG. 18 illustrates the logic circuit details for the selection of the minimum of the computed values D1 through D4 and performs a bit inversion of that minimum value if required. A comparitor 620 and an associated MUX 624 determine which of the two values on their inputs is less and forwards the minimum value as the output. In a like manner the comparitor 622 and the MUX 626 determine which of the two values on their inputs is less and forwards the minimum value as the output. These two minimum output values are directed to a comparator 628 and an associated MUX 630 which operate to determine which of the minimum values is the overall minimum value. The overall minimum value and its bit inverse are directed to the B and the A inputs, respectively, of a MUX 632. The output of the MUX 632 is fed to the register 572 and represents the density level to be printed. The MUX 632 receives on its selection input SO the value V0. The value VO determines whether the overall minimum value is inverted or not based on whether the dot size exceeds 50% or not.

While there has been shown what are considered to be the preferred embodiments of the invention, it will be manifest that many changes and modifications may be made therein without departing from the essential spirit of the invention. It is intended, therefore, in the annexed claims, to cover all such changes and modifications as may fall within the true scope of the invention.

Industrial Applicability and Advantages

The method of the present invention may be used in any system that prints halftone dots wherein the dots are stored as digital values. The advantage of the present invention is that a variable density edge profile may be efficiently formed for halftone dots that are represented by digital values derived from lines that define the contour of the dots.

We claim:

1. A method for writing a halftone dot having a variable density dot edge profile and associated writing locations and for use with methods that represent a boundary of the halftone dot with an envelope of multiple geometric elements, comprising the steps of:

a) associating density values with the geometric elements as a function of the writing locations;

b) determining a minimum of the associated density values at one of the writing locations;

c) performing a writing with the minimum of the associated density values at the one of the writing locations; and d) repeating steps a) through c) for each remaining ones of the writing locations associated with the halftone dot.

2. A method for writing a halftone dot having a variable density dot edge profile and associated writing locations and for use with methods that represent a boundary of the halftone dot with an envelope of multiple geometric elements, comprising the steps of:

a) computing distance values between the geometric elements and one of the writing locations;

b) determining associated density values for the computed distance values;

c) determining a minimum of the associated density values;

d) performing a writing with the minimum of the associated density values at the one of the writing locations; and e) repeating steps a) through d) for remaining ones of the writing locations associated with the halftone dot.

3. A method for writing a halftone dot having a variable density dot edge profile and associated writing locations and for use with methods that represent a boundary of the halftone dot with an envelope of multiple geometric elements, comprising the steps of:

a) forming a table of density values addressable by distance values;

b) computing the distance values between the geometric elements and one of the writing locations;

c) addressing the table with the distance values to access associated density values;

d) determining a minimum of the associated density values;

e) performing a writing with the minimum of the density values at the one of the writing locations; and f) repeating steps b) through e) for remaining ones of the writing locations associated with the halftone dot.

4. The method according to claim 3, wherein the multiple geometric elements are a plurality of straight lines forming an envelope that defines dot edge.

5. The method according to claim 3, wherein the computed distance values are represented by a binary sequence and further comprising the steps of:

i) selecting bits from the sequence to address the table to effect a scaling of the dot profile; and ii) enabling access to the table when the computed distance values are within the writing location of the dot.

6. An apparatus for writing a halftone dot having a variable density dot edge profile and a writing location and for use with techniques that represent a boundary of the halftone dot with an envelope of multiple geometric elements, comprising:

a) means for associating density values with the geometric elements as a function of the writing location;

b) means for determining a minimum of the associated density values; and c) means for receiving the minimum of the associated density values and for initiating a writing with the minimum at the writing location.

7. An apparatus for writing a halftone dot having a variable density dot edge profile and a writing location and for use with techniques that represent a boundary of the halftone dot with an envelope of multiple geometric elements, comprising:

a) means for computing distance values between the geometric elements and the writing location;

b) means for determining associated density values for the distance values;

c) means for selecting a minimum density value of the associated density values; and d) means for initiating a writing with the minimum density value at the writing location.

8. Am apparatus for writing a halftone dot having a variable density dot edge profile and a writing location and for use with techniques that represent a boundary of the halftone dot with an envelope of multiple geometric elements, comprising:

a) means for storing a table of density values addressable by distance values;

b) means for computing the distance values between the geometric elements and the writing location;

c) means for addressing the table with the distance values to output associated density values;

d) means for receiving the outputted associated density values and for selecting a minimum of the associated density values; and e) means for initiating a writing with the minimum at the writing location.

9. The apparatus according to claim 8, wherein the multiple geometric elements are a plurality of straight lines forming an envelope that defines a dot edge.

10. The apparatus according to claim 8, wherein the distance values are represented by a binary sequence and further comprising:

i) means responsive to selected bits from the binary sequence to address the table to effect a scaling of the dot edge profile; and ii) means for enabling access to the table when the distance values are within the writing location of the dot.

11. The apparatus according to claim 7, wherein said means for determining associated density values is comprised of:

means for providing a first density value when one of the distance values is outside of the dot edge profile;

means for providing a second density value when one of the distance values is inside of the dot edge profile; and means for providing density values that range from said first density value to said second density value as a function of the distance values.

* * * * *